April 2, 1957 R. J. STAHL ET AL 2,787,655

COLOR TELEVISION CAMERA CONTROL

Filed Nov. 30, 1951

INVENTORS
ROBERT J. STAHL &
NORMAN L. HEIKES
BY Lippincott & Smith.
ATTORNEYS

United States Patent Office 2,787,655

Patented Apr. 2, 1957

2,787,655

COLOR TELEVISION CAMERA CONTROL

Robert J. Stahl, Redwood City, Calif., and Norman L. Heikes, Madrid, N. Mex., assignors to California Technical Industries, a corporation of California Application November 30, 1951, Serial No. 259,195

20 Claims. (Cl. 178—5.4)

This invention relates to television apparatus, and particularly to apparatus utilized for the transmission of signals from which television images are re-creatable at reception points (monitors, receivers or relays) either in colors closely approximating those of the scene at the point of transmission, or as black-and-white (monochrome) versions thereof. For simplicity, where the term "black-and-white" is used herein, it will be understood to represent also transmission in any one color or in monochrome.

Various methods of producing television image signals have been proposed for color operations. Included among such proposals is the so-called field-sequential system. In field-sequential color operations the image is analyzed in such fashion that successive fields are represented in their entirety in cyclically repeating component colors of an additive polychrome system. At reception points the images are so reproduced as to become observable in colors by the reproduction of complete fields of successively and cyclically changing characteristics representative of the different colors. The color becomes observable by viewing through a color filter which cyclically reveals the image light to the observer in different colors, or in newer proposals the color effects are directly produced upon the viewing target of a suitable direct-view color tube.

While a system of the field-sequential character has been considered as standardized by a decision rendered in September, 1950, by the Federal Communications Commission, it nonetheless is not of such a nature as to be generally compatible with existing black-and-white receivers. This is because of the fact that existing black-and-white receivers cannot receive a transmission of the image analyzed in field-sequential color as a black-and-white representation without making substantial changes and modifications to the existing receiver. These receiver changes are necessitated for many reasons, included among which are, at the present date, the need of providing a field scansion rate very substantially higher than that required for systems in which the color operations and the black-and-white operations occur with generally compatible standards.

At the present time, the field scanning rate proposed for field-sequential color operations is 144 fields per second as compared to the now standardized commercially used black-and-white field scanning rate of 60 fields per second, which makes the ratio of 12:5. The result is that the number of lines per picture field is substantially reduced over that permissible with black-and-white and all so-called compatible color operations, assuming, of course, that the complete transmission is confined to the band of 6 megacycles now allotted for television transmission on any one station. Consequently, with field-sequential operations, the geometric picture resolution obtainable from the resulting transmission is only approximately 45% of that obtainable in black-and-white, or in compatible color television systems.

The present invention is related to an apparatus and method for improving the transmission of color television signals in systems of such character that the complete operation is maintained compatible with all existing standardized black-and-white operations. At the same time, the present invention is directed to a method and apparatus for converting light images into television signalling information where the signal conversion may be such as to follow precisely the proposals of the so-called dot-sequential system of the general type now being advocated by Radio Corporation of America and which is currently being demonstrated in both New York and Washington. The method and system herein proposed is also equally applicable and adaptable to the form of color television transmission currently being proposed by the National Television System Committee which constitutes, in a sense, some modifications of the proposals of Radio Corporation of America with ideas of other experimenting groups added.

In their essence, however, each of these systems may be regarded in their nature as closely approximating the so-called simultaneous systems. This is because of the fact that the information regarding detail in the scanned picture is sent continuously with the transmission method utilizing the broad principles which have become known in the art as the "mixed-highs." At the moment consideration in detail of the precise nature of the "mixed-highs" operation is unnecessary, since this is generally well known and the systems as a whole are described in the many papers included in the complete publication of the "Proceedings of the Institute of Radio Engineers" volume 39, No. 10, for October, 1951, to which complete volume reference is herein made for the state of the art as it exists.

The same "Proceedings of the Institute of Radio Engineers" incorporates substantially the papers included within a published bulletin entitled "LB-841, Direct-View Color Kinescopes," published by Radio Corporation of America on September 7, 1951 for distribution to its licensees. Papers numbered as 4017 through 4027, inclusive, of the "Proceedings of the Institute of Radio Engineers" for October, 1951 are substantially duplicates of the reports included in the mentioned bulletin of Radio Corporation of America.

In each of the so-called "RCA System" and the "NTSC System," hereinabove mentioned, the image detail is sent continuously in the higher frequency range of the bandwidth allotted to the transmission. Illustratively, assuming that the receiver amplifiers are generally flat to four megacycles, and that the permissible modulation range for transmission is of a bandwidth extending out from the main carrier on one side by substantially four megacycles (bearing in mind that vestigial sideband transmission is permitted on the opposite side of the carrier), the mixed-highs signals which represent the picture detail may be transmitted from some value intermediate 2.0 and about 4.0 megacycles. The Hazeltine Electronics Corporation, of Little Neck, New York, has demonstrated that even with color transmitted in the range between zero and 0.1 megacycles and the mixed-highs signals occupying, for instance, a band between 0.1 megacycles and 4 megacycles, reasonably good color television image reproduction can be achieved. Such facts are explained in the publication "Electronics," published by McGraw-Hill Publishing Company, in the issue for December, 1950, volume 23, No. 12. To illustrate the effects of mixed-highs, the cover of the said "Electronics" publication showed a comparison of a simultaneous transmission of the color picture using a 12-megacycle video band and a mixed-highs transmission occupying a 4.2-megacycle band and the color information restricted to a band of only 0.1 megacycle. For transmissions of this type, illustratively, it may be regarded as if the high frequency components representing the picture detail are continuously transmitted and the low frequency components representing the color values (chroma) are transmitted in band-sharing fashion in the lower frequency portion of the allotted frequency band.

High fidelity color transmissions, such as are required for optimum operations, however, are generally regarded as more closely approached when the color signals occupy a greater portion of the allotted bandwidth for transmission than explained in the aforesaid "Electronics" publication. Accordingly, to illustrate the invention herein to be set forth it will be assumed that the mixed-highs are transmitted in the frequency range of between 1.0 and 2.0 megacycles up to approximately 4.0 megacycles. The lower frequency signalling frequencies representing the color (chroma) are then caused to occupy the lower frequency portion of the allotted band from a range of approximately direct current up to somewhere between 1.0 and 2.0 megacycles, depending, of course, upon the specific factors desirable for design and transmission.

Further, the present invention, as it will be set forth and explained, will be found to be applicable not only to each of the foregoing forms of system as proposed by Radio Corporation of America (RCA) and National Television System Committee (NTSC), but also applicable to the so-called segment-sequential system of transmission already outlined and explained in Letters Patent of the United States of the present inventors No. 2,630,485, dated March 3, 1953 and entitled "Color Television Apparatus," and the thereto-related Letters Patent of the United States No. 2,748,188, granted May 29, 1956 and entitled "Color Television Synchronizing Apparatus."

Heretofore, as far as is known, color television transmissions have suffered generally because of distortions produced in the pictures due to the fact that it has been necessary (except for the field-sequential operations) to pick up the separate color images representative of the scene separated into its additive component colors by separate camera tubes, one tube being used to develop signals representative of each component. Despite the fact that in camera apparatus it is possible to operate with considerably higher precision than is the case with receiver operations, where mass production is usually necessary, it is, nonetheless, a problem of great importance to provide the necessary precisely identical three separate images on three separate camera tubes, disregarding the fact that the electrostatic manifestations of these produced images must be scanned concurrently and symmetrically in order to achieve the desired signal transmission. To illustrate but a few of the difficulties of the prior art utilizing a multiplicity of separate camera tubes to select the separate color images, for instance, one for each of the red, the blue and the green color component images, it is necessary that the optical system be so designed that it registers the separate color images upon separate tubes in precisely the same size and with substantially precise focusing on each tube. It is also necessary if the transmission is to be free from distortions that the separate tubes be so controlled that when the output signals therefrom are developed as a result of scanning the electrostatic charge manifestations of the impinging image, the scanning in each tube always occurs homologously at precisely the same rate. It therefore is essential that not only must the tube geometry of each of the camera tubes be generally precise duplicates one of the other, but also that the deflection control mechanism and circuitry be effective in precisely the same way upon each of the separate tubes. Any defects in the optical system result in conditions of parallax and out-of-focus which destroy the fidelity of operation. Any change in relationship of the deflection operation in one tube with respect to another, or the effect of distorting fields on one tube to an extent greater than on some other tube, results in a combined output signal which is not a true representation of the scanned image, but, rather, includes distortions. Further than this, the cost of a camera and control apparatus using three camera tubes (each very expensive), the optical system for use therewith and control circuitry of such precision as to approach practical operation, makes the installation cost of any adequate number of cameras for a color television studio almost prohibitive.

According to the present invention, the foregoing difficulties are obviated through the use of only a single camera tube for the purpose of image analysis and the development of the color television signals which are used at receiving points to re-create the transmitted signals into either color television images or black-and-white versions of the image. A camera tube of the same general type adapted for black-and-white (monochrome) operations is utilized in precisely the same form as that in which it is now operated to create the video signals from which the now-standardized black-and-white transmissions result (except for certain controls effective externally thereof, some signal channel modifications, and certain modifications of the optical system used to project an image of the scene upon the tube). Color television images are developed at receiving points (receivers, monitors, relays and the like) according to the present invention from such a single camera tube as a result of projection thereon of a single image of substantially the same size as would be employed were the camera tube to be utilized to produce signals from which a standard form of black-and-white operation would result.

From the standpoint of directing the image of the scene upon the tube, minor changes only are required. They are all external to the camera tube and involve, in the main, projecting the image of the scene on to the camera tube photo-sensitive surface through at least a color filter formed of a plurality of substantially parallel strips. Each strip is of one of the unsaturated colors forming the component or primary colors of a multicolor additive operation. Each color filter strip is preferably, and as an example of one form of the invention, of such width that when the image thereof is projected upon the light-sensitive element of the television camera tube to create the charge representations from which the image or video signals result, it is imaged in such a way that its width corresponds substantially to a width representing two-thirds that of one point or elemental area of the picture or scene as it is analyzed in black-and-white (monochrome) operations.

The reasons for imaging the filter strips to such widths will be explained in detail at a later point herein, but for the moment it may be mentioned that in tricolor operation, which is being used herein to explain the nature of this invention, it is desirable that the color cycle repeat at a frequency which is close to that representing the maximum which the system is capable of transmitting. Under the circumstances, a black-and-white (monochrome) operation would be such that for a four-megacycle pass band of the amplifiers the time period utilized to scan one point of the image would be one-eighth of a microsecond. Accordingly, in one-quarter microsecond two image points can be scanned. However, for a tricolor operation, if the color repetition frequency is in the range of approximately four megacycles per second, it is necessary to develop three separate color versions in each one-quarter microsecond period to achieve the desired color repetition rate. Thus, in contrast, the two image points which would be represented by a black-and-white or monochrome picture each one-quarter microsecond the color operation is made capable of portraying approximately three separate color versions in the same time period. Consequently, the actual imaged filter strip widths are approximately two-thirds that of any one point of the black-and-white image as it is analyzed.

The lengths of the filter strips as projected upon the camera tube are at least equal to the height of the picture area to be scanned. Consequently, if a scanning operation occurs within the camera tube and the electrostatic charge produced as a result of response from the light-sensitive element of the tube to the image projected thereon is scanned in accordance with usual operations of a camera tube of the so-called image orthicon type, the successive scannings from point to point produce image (video) signals from which "mixed-highs" signals are developed, as well as signals representing the image in its different component colors, such as the additive component or primary colors of red, blue and green, repeating in any selected and cyclic order.

By the proposal of the present invention, however, the color filter strips through which the image of the scene is projected upon the camera tube are all incompletely saturated areas so that they represent generally hues of the additive primary or component colors red, blue and green, with controlled amounts of white light added therewith. The addition of white light generally may be regarded as being similar for all of the various filters, so that each of the red, green and blue filters (assuming a tricolor operation) causes a certain amount of response from the photo-sensitive element of the camera tube in a manner generally like that which would result were the image projected thereon for black-and-white transmission operations. In addition, because of the fact that the color filters through which the image of the scene is directed to the light-sensitive element of the camera tube transmits one of the component colors at greater degree than the other two, the representation of the scene in its different component colors is accentuated from strip to strip in one of the several component colors. The result is that resting upon the pedestal formed by the concurrent activation of the target by light of all colors are accentuated response indications of the particular color of light most readily passing through the individual color filter sections.

This operation is such that from point to point on the photo-sensitive surface of the camera tube the accentuated response may be that of green, that of blue, or that of red (or any other selected order of these colors) after which the cycle will repeat. It thus appears that the detail in each of the component colors of the image as selected can be only approximately one-half, as a maximum, of that of the detail representative of the image in black-and-white. However, in view of the fact that it has been shown, both by demonstration and theory, that high-definition color pictures do not require high definition in each of the component colors, but merely utilize the color signals to supply the color information with the picture detail supplied by mixed-highs, it at once will become apparent that by properly selecting the color components from the picture signals, high fidelity color operations are achieved by the presently disclosed proposals.

This invention provides apparatus for accomplishing the foregoing objectives. It does so without the inclusion of any moving parts by imaging the scene upon the strip-like color filter and thence upon the camera tube. The color filter and the optical system are held in fixed position relative to the camera tube (except for permissible low frequency relative movement between the tube and the filter, or the optical system, occurring at an extremely slow rate of about five cycles per minute, as set forth in a concurrently-filed application for Letters Patent of the United States of the present applicants entitled "Image Displacement Device for Television Cameras"). The rate of such movement is so slow that, as a practical matter, all elements may be regarded as fixed in position.

Since it is important in a transmission of this nature to establish a precisely uniform tracking or uniformity of movement of the scanning operation relative to the charge effects manifested by the different color filter strips as effective on the electrode member scanned, and which electrode member carries an electrostatic charge indicative of the light and shadow of the scene not only in black-and-white, but also in the component colors thereof, a tracking filter image (also in the form of strips of different light-transmitting characteristics) is also superimposed upon the photosensitive element of the camera tube in such a way as to occupy substantially the same area as does the image of the color filter and the image of the scene upon the photo-sensitive element.

A tracking filter in its broadest aspects has already been explained in Letters Patent of the United States No. 2,630,485 granted to the present applicants, heretofore mentioned. The tracking filter already disclosed included a plurality of strips individually arranged to accentuate the transmission of one light characteristic to an extent different from others. The light image of the tracking filter, in effect, is added to that due to the imaged scene upon the camera tube. Then, provisions are made to cancel any effect of the tracking filter from any developed signals so that the outgoing signal constitutes a true representation of the scene. A tracking filter might consist, for instance, of filter strips which are either transparent or opaque, or filter strips transmitting one of the primary or component colors into which the scene is analyzed or color filter strips transmitting any one of the colors complementary to the selected primary or component colors. It is within the concept of the present invention to utilize a filter of such nature, but for purposes of simplicity of operation, as well as explanation, and, above all, simplicity of manufacture, the tracking filter herein proposed may be considered as being one of a variety in which there are only two types of strips, one of which transmits light to a different degree or to a different extent than the other. As such, for purposes of illustration, one of the types of strips of the tracking filter may be a strip which is generally opaque and the other type may be a strip having transparency to all colors of light but to a minor degree, and thus constitute strips of the nature of gray, rather than opacities.

The strips of the tracking filter are also arranged as substantially parallel strips. They are preferably of such size (width and length) that when projected upon the photo-sensitive element of the camera tube along with the images of the color filter and the scene projected therethrough, each individual tracking filter strip occupies a width approximating that of each separate color filter strip and of substantially like length. With the tracking filter strips assumed to be alternately of zero and moderate light transmission characteristics, for example, and with the color filter strips being in a repeating cycle chosen in a selected order to include the colors red, blue and green, it will be appreciated that there is a general relationship of about three to two between the repetition cycle of the color filter strips and tracking filter strips, insofar as the projected image is concerned.

To make for simplicity of operation and to make more readily possible a selection of the tracking filter frequency and the color filter frequency, it is preferable to project the strips of each of the filters in such a way that their edges are substantially parallel. The filter strips of the color and tracking filters may be either superimposed or displaced, as desired. The important fact is that the tracking frequency be discernible from the scanned output signal.

As close to precise parallelism of the projected filter strips in the camera tube light-sensitive element as is possible serves to simplify operating circuitry of the tube, although it is to be understood that the proposal still functions even in cases where there is a lack of parallelism in the arrangement and the tracking filters in a projected state appear or are imaged on the photo-sensitive element of the camera tube in a slightly diagonal relationship to the strips of the color image filter. In either case, with scanning occurring within the tube, the tracking filter supplies or causes signals which provide information concerning the rate of motion of the scanning beam in the camera tube, just as readily as do the alined filter images but, as will be apparent from what is to be stated herein at a later point, complexities of circuitry may be introduced by such an arrangement.

Accordingly, as will herein be explained, the operation will be assumed to be characterized by substantially parallelly arranged filters, with the repetition cycle of the representative filters in the general range of approximately two to three for the color and the tracking elements. Under these conditions, where reference is made to "parallel" positioning it will be understood to mean either precise parallelism or an approximate or substantial parallelism.

In one condition of operation the color filter strips may be selected in such width that in the scanning operation there are approximately 542 strips to the inch. The color repetition frequency wil be at a rate of approximately 3.969 megacycles per second, as will later be explained, for standardized scanning conditions. It is practical to form the tracking filter with strips of approximately the same width as the color filter strips as they are projected upon the photo-sensitive element of the camera tube so that the tracking filter when projected on the tube causes the development, along with the signal resulting from scanning of the image, of a control frequency which is one and one-half times as great as that developed by the color filter.

It is, of course, possible to arrange the color filter strips and the tracking filter strips as they are imaged upon the tube in various patterns, as will be evident from the related above identified Letters Patent Nos. 2,630,485 and 2,748,188 and as will become apparent also from a further concurrently filed companion application entitled "Color Television Camera." The present application, however, for purposes of simplicity of explanation, will refer to the relative positions of the color and tracking filters as being substantially parallel one with the other. As described in the mentioned applications, it will be assumed that the color and tracking filters are imaged upon the light-sensitive element of the camera tube so that when the images thereof are scanned (or the electrostatic charges resulting from the images thereof are scanned), the line-scanning operation occurs in a direction transverse to the long dimension of the filter strips. In the preferred operation, the transverse scanning direction approaches a path which is substantially normal to the long dimension of the filter strip, but it can be any transverse pattern that is feasible and which falls within the scope of the present disclosure.

Generally speaking, and assuming that the transmission band allotted to the color television operation is limited to a total frequency range of six megacycles, it is preferable that the color filter produce as a part of the signal output resulting from scansion within the tube a distinguishable frequency of some frequency value which may be termed $a$. The tracking filter should produce a second frequency which may be called $b$. The frequencies $a$ and $b$ for the six-megacycle type of operation may be considered as being non-harmonically related one to the other. They may also be regarded as being frequencies which are each a harmonic of a third frequency, called $c$. Any suitable values for these frequencies may be chosen, but for the purpose of illustrating the present invention, it will be assumed that the tracking frequency $b$ is higher than the color repetition frequency $a$, and that the frequencies $b$ and $a$ are in relationships of the order of approximately three to two. From frequencies chosen in this range, that frequency initially proposed by the RCA group as a typical example of a color frequency, namely 3.58+ megacycles per second, may be utilized. Alternatively, the frequency of 3.89+ megacycles per second proposed by the NTSC may be developed. With scansion occurring at rates now standard for black-and-white, the herein-described color filter will illustratively be considered as having strip widths such that when the charge effects due to the color filter are scanned the color cycle will repeat at a repetition frequency of 3.969 megacycles per second.

On the assumption that a color repetition frequency of 3.969 megacycles per second is selected, the color filter strip is formed of a sequence or repeating cycle of strips chosen from the colors red, green and blue, and of a number of the general order such that with the optical system used, the strips appear as 542 per inch, as they are projected upon the photo-sensitive element of the camera tube. For an operation where the pictures are reproduced at the rate of 30 picture frames per second (60 picture fields per second of 262½ lines each and interlaced 2:1), the time to trace each picture line is approximately 63.5 microseconds. Allowing for the standardized 14% return line blanking period for each line scanned (as per present black-and-white standards), this means a usable line-scanning period of approximately 54.6 microseconds, within which time, for the assumed image width of 1.2" on the photo-sensitive surface of the camera tube, approximately 650 color filter strips (approximately 217 color cycles) are scanned. This provides, with a scene and the foregoing form and type of filters imaged upon the camera tube photo-sensitive surface to a size of 0.9" high and 1.2" wide (with a diagonal of 1.5"), a color repetition frequency of approximately 3.969 megacycles per second. This frequency herein used illustratively approximates that frequency value suggested by NTSC.

When the imaged scene focused on the photo-sensitive element of the camea tube causes the development of electrostatic charges which are scanned, the resultant signal outputs obtainable from the camera tube or its associated video amplifier include information concerning the scene or image focused upon the tube. With this video signal information there are also present signals from which an indication of the color filter frequency and the tracking filter frequency may be derived. The video signal information is also usually followed during the blanking period at the end of each scanning line by the line sync pulse and then signal information indicative of the color phase.

According to one form of the operation the tracking filter frequency is utilized by selecting from the camera output or from the camera video amplifier output the particular tracking frequency by way of a bandpass filter, for instance. Such a bandpass filter is arranged to pass an extremely narrow band of frequency. It peaks at the selected frequency for the tracking filter according to the system as it is designed. To provide a control over the scanning operation, this selected freqency is then discriminated against a stabilized and constant frequency of precisely the normal optimum tracking frequency to develop a control signal. The constant frequency is readily derivable from the usual sync signal generator. Through appropriate controls the discriminator output is caused to modify (if necessary) the scanning operation in the camera tube in such a way as momentarily to accelerate or decelerate the scanning beam in its scanning path transverse to the widths of the imaged filter strips to such an extent that substantially a precisely uniform rate of scansion is established. The already mentioned, U. S. Letters Patent No. 2,630,485, describes one form of arrangement to effect tracking.

Phasing operations are carried forward in a manner which will later be explained. From the standpoint of utilization of the remaining frequency band, the signal output of the camera or the camera video amplifier is then fed to a suitable form of tracking signal eleminator, which is preferably in the form of a band elimination filter. For the purpose of assuming round numbers to explain, if it be assumed that the color cycle is 4 megacycles (according to the assumed example herein it will be 3.969+ megacycles per second) and that a 2:3 relationship is maintained between the color and tracking filter control cycle, this will be provided by a tracking filter which produces a tracking control frequency of 6.0 megacycles (5.9535 megacycles per second for the assumed example). With this form of circuit any frequencies representative of the tracking information (which is to be used only at the transmitter end of the system) are eliminated from the outgoing signals.

In apparatus of the type herein set forth, it is important that the signal output from the camera (or the camera video amplifier) have removed therefrom these signal components representative of tracking information prior to utilization in any circuits to develop the "mixed-highs" (detail) and color information components. It is recognized that the transmitter would cut-off such signal components from the output supplied to any therewith associated communication channel since the tracking frequency is higher than the maximum frequency passed, but reliance upon this effect would leave the tracking signal information included in the signals supplied to these circuits used to produce the "mixed-highs" and color signals.

Signals minus the tracking filter information are then supplied to a unit which may be termed a pedestal suppressor. This unit may be in the form of a filter or an amplifier that has a controlled response providing an output at the color repetition frequency which is of sufficiently greater amplitude than the components of brightness in the picture, so that the proper ratio of the amplitude of the individual colors to the average value may be realized. The signals representing the complete frequency band minus the suppressed tracking filter frequency are supplied to a bandpass filter which is arranged to pass the upper end of the frequency range. Thus, for a four-megacycle system where the response is flat or substantially flat to frequencies of the order of four megacycles per second, this might be filter passing frequencies in the range between 1.5 and 4.0 megacycles. These signal outputs would constitute the mixed-highs of the operation.

The signal output of the pedestal suppressor which includes the color information in which the representations of the various component colors each occur at repetition frequencies assumed to be in the general neighborhood of four megacycles each per second are then directed into a sampler or a modulator, to which is also supplied as a constant frequency or modulating frequency a sinusoidal wave occuring at precisely the desired color cycle repetition frequency (herein the assumed frequency of 3.89+ megacycles per second). By appropriate sampling or modulating, selection of the three signals indicative of red, blue and green is made by taking samples of the input signals each with 120° phase spacings on the sampling or modulating wave and limiting (preferably) the sampling period to approximately 10% to 20% of this period. By feeding these selected frequencies into three separate filters, each of a low pass variety, passing frequencies between substantially direct current (D. C.) and some frequency value less than the color repetition frequency, it is possible to derive from each filter the output of one of the selected component colors. Because the low pass filters have a cutoff frequency which is less than that at which the sampled color information supplied to them, the output effect is as if a continuous signal indicative of the color in question were supplied continually to the input. In practice, and in order that mixed-highs shall be included from the color channel, these filters are usually arranged to cut off at an upper frequency of about 1.0 to 2.0 megacycles per second.

With the foregoing generalized description of the invention having been set forth, it will be appreciated that one of the objects of the present invention is that of providing a color television scanning apparatus wherein images may be projected upon a single camera tube only, so that with scansion in the camera tube following normal procedures it is possible to derive from that single camera tube signal information indicative of both the high detail in the picture, this being in the form of signals of the so-called mixed-highs variety, and signal information represented as being continually present and indicative of the color values in the same scene as it is scanned.

Other objects of the invention are those of providing camera apparatus for color television image analysis in which there is a complete freedom of moving parts of the optical systems, filters, or the like.

Another object of the invention is that of providing color television apparatus wherein a single camera tube produces signals representative of each selected component color of a multicolor operation so that all optical distortion effects that would be present in multiple tube cameras are eliminated.

Still other objects of the invention are to provide color television apparatus wherein the camera tube as used to translate the scene imaged thereon will produce signals from which the replica may be developed at the suitable points of reception such as receivers, monitors, relays and the like, may be in either black-and-white or color, and with substantially equal detail in all respects and without introducing any observable flicker effects, whether between fields, lines, portions of lines, or dots from which the lines are composed.

Other objects of the invention are those of providing from television apparatus wherein the image point analysis is made substantially sequentially from one point to another in a series of cyclically repeating colors a simultaneously present low frequency version of the image in each of its component colors and concurrently therewith developing signals representing as a black-and-white version or as mixed-highs the picture detail.

Other objects of the invention are to provide simplified forms of color analysis which will, nonetheless, insure high fidelity operation and which analysis will develop signals from which transmission operations can be carried forward according to any of the presently-proposed forms of compatible operations of the so-called dot type, as advocated by Radio Corporation of America, the band sharing simultaneous types advocated by the National Television System Committee, and the segment type already proposed by the present applicants.

Other and further objects of the invention will become apparent from a consideration of the following specification and its claims, particularly when read in connection with the accompanying drawings, wherein:

Fig. 1 schematically represents a form of color filter suitable for use in connection with the invention, it being understood that the representation is purely schematic and in no way intended to be drawn to scale, but merely to represent a series of substantially uniform width strips arranged in a cyclically repeating group of filter sections each of one of the unsaturated component colors of an additive multicolor;

Figures 1, 2, 3, 4, 5:
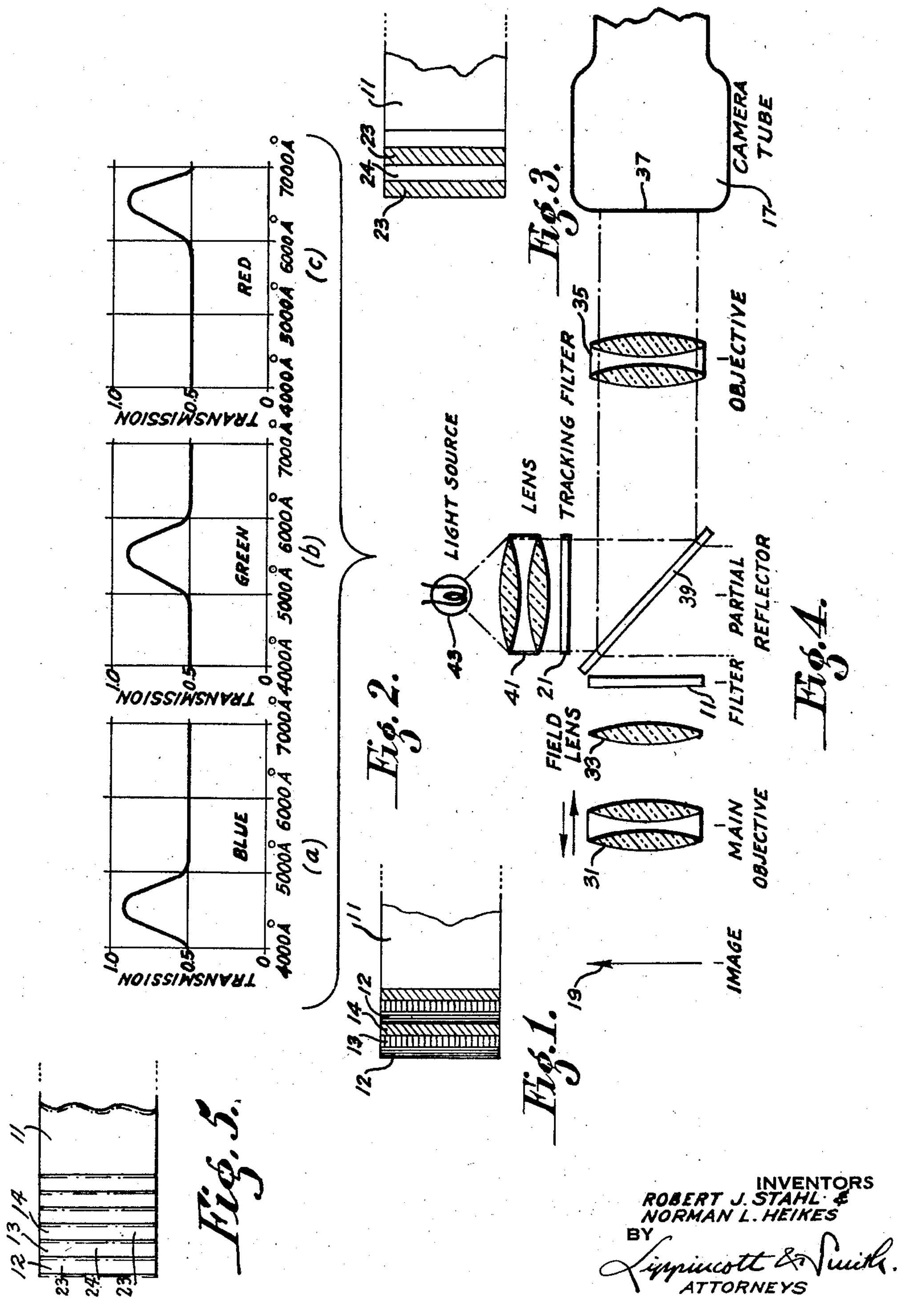
Fig. 2 represents by its three curves *a*, *b*, and *c*, schematically, the light transmission of the blue, green and red filters, respectively, in reference to wave lengths and percent transparency.
Fig. 3 is a schematic representation of a tracking image filter section also in no way indicative of being drawn to scale, but merely to represent a repeating cycle of alternate filter strips of different light transparency.
Fig. 4 is a schematic showing of the optical system and filter arrangement for directing an image of a scene upon a television camera tube light-sensitive surface.
Fig. 5 is a schematic representation, likewise not to scale, of the superimposed color and tracking filters as they are projected upon the light-sensitive element of the television camera tube.

Referring now to the drawings, the color filter 11 depicted in Fig. 1 preferably consists of a plurality of substantially parallel filter strips formed, illustratively, as red transparencies 12, blue transparencies 13, and green transparencies 14, repeating, in the illustrated example, in a color cycle designated as red, blue, green. Preferably, the filter strips occupy an area in which the length of the filter strips correspond generally to three units, whereas the combined width of all of the several filter strips collectively totals four units. This provides the desired 4:3 aspect ratio in the final picture.

The red, blue and green filter strips 12, 13 and 14 are each of a width such that when projected upon the light-sensitive element of the camera tube 17 (see Figs. 4 and 6) they can be focused to a width corresponding to approximately that of one elemental area, into which the scene or image 19 (see Fig. 4) is projected upon the camera tube. The filter strips preferably are unsaturated, so that hues of the different component colors of a multicolor, such as the red, blue and green customarily considered as the primary or component colors of a tricolor additive system transmit light wavelengths of the characters generally shown by the three curves of Fig. 2. It will be observed that there is a certain selected transmission in all light wavelengths (illustratively, wavelengths between 4000 A. and 7000 A.) to a selected extent. A relative transparency to all colors in the range of about 50% is adequate, although for some conditions of operation a lesser transmission or a slightly greater transmission of the light of all colors may be preferable. Ordinarily, for the blue filter, the transmission in the region of blue-light wavelengths is considerably greater, as is the case in the green range, for the green filter, and in the red range for the red filter. The extent to which the different filters pass more readily the particular component color of blue, green or red, can, of course, be controlled and utilized to provide a high degree of color fidelity and a favorable signal-to-noise ratio and, in addition, to establish an immunity to spurious patterns.

The manner of constructing the color filter 11 is not specifically a part of this invention. One suitable form of constructing the filter has already been set forth in Letters Patent of the United States of the present applicants, No. 2,630,485, to which reference has already been made. However, reviewing in brief this general construction, the filter is preferably constructed by outlining the colors with great precision on a large master copy which can be reproduced. In this way the relative sizes of the filter strips can be very accurately portrayed, as well as their colors. The master is then suitably photographed on a suitable photographic film or plate, such as that known in the art as Kodachrome, in order that a copy thereof of a usable size may be provided. By suitable selection of the optical system, the image of this filter may either be enlarged, reduced or focused in a 1:1 relationship on the light-sensitive element of the camera tube.

The tracking filter later to be mentioned herein may also be formed in similar manner, with the exception that if the filter strips of the tracking filter shall be chosen as transparencies and opacities, the reproduction on color film need not be made, and an ordinary photographic film or plate is adequate for the purpose.

Making reference particularly to curve *a* of Fig. 2, it will be seen that the filter which is proposed primarily to develop the blue component color has a high transmission in the blue range of between 4000 A. and 5000 A., for instance. There is, however, some transmission in all wavelengths of light between the blue and the red or the near-infrared. The curves for the green and the red filters appear to be self-explanatory, in the light of the foregoing, and need not be further discussed.

Fig. 3 sets forth what may be considered to represent schematically either a color phasing filter or a color tracking filter. Considering the showing as a color tracking filter, the drawing represents the element on an exaggerated scale relative to the color filter suggested by Fig. 1. As a color phasing filter, the relative proportions of Figs. 1 and 3 are approximately correct. Filters of such characteristics are provided in order that there may be derived from the signal output of the camera tube as a result of scansion therein signals indicative of the phase at which the scanning operation is occurring (for the color phasing filter) and signals at the rate at which the scanning operation is taking place (for the color tracking filter). The color phasing filter may be formed at the edge, say the left edge, of either the color filter 11 or the tracking filter 21. This is for conditions where it is used following line blanking. For use after field blanking, the color phasing filter section may be formed above or below the color or tracking filter.

The phasing filter comprises alternate strips of different light-transmitting characteristics, as does the tracking filter. Hence, bearing in mind the fact that the proportions may be different for each of these filters, one form of illustration only has been utilized. The reason for the strip width differences between the tracking and phasing filters comes about because of the fact that the tracking frequency to be developed, as already suggested, is made higher than the color repetition frequency, and hence, with the assumed 3:2 relationship between the tracking frequency and the color repetition frequency, it can be seen, for instance, that there will be three sets of alternate strips of the tracking filter which will produce a control on the output signal over the same period of time allotted for scansion as would be occupied by two sets of color filter strips of the selected repeating sequence for each set of red, blue and green. With respect to the phasing filter, however, it is desired that the frequency developed shall be like that of the color cycle, so that the strips of different light transmission characteristics, illustratively the opaque strips 23 and the transparent strips 24, shall, together, assume a width such that when projected upon the camera tube light-sensitive target they shall occupy a width corresponding to that of three color strips, namely the strips 12, 13 and 14.

In the scanning operation as normally carried forward, the operation is usually such that there is a slight over-scan of the normal picture area. The color phasing filter is usually imaged upon the camera tube target to occupy thereon that portion which would be included in the overscan range so that it extends out beyond the picture for a short distance. Because of the small width of the strips, this small distance is actually only a few hundredths of an inch, but is adequate for the purpose intended.

In one form of assembly, the color phasing filter as utilized is imaged to occupy a width on the camera tube photo-cathode of about 0.004". Each filter strip in the assumed example is approximately 0.0028" when imaged upon the photo-cathode tube area. This means that the color phasing filter strips occur with a spacing of about 362 to the inch, but as they are imaged upon the photo-sensitive cathode there are only enough strips to provide about seven cycles of signal representing the phase condition. The frequency of this signal corresponds to the color cycle.

The tracking filter itself, and neglecting the possibility of the color phasing filter on its left edge, preferably has its strips (generally of opacities and transparencies) of approximately the width of the strips of the color filter itself. In the illustrated example, this would mean that the alternate strips of the tracking filter are arranged at approximately 542 strips to the inch, which means that the individual strips are approximately 0.0018 wide when projected upon the photo-sensitive element of the camera tube.

From what has been stated above, and in the reference made to the width of the various filter strips, it has been desirable to consider the relative size when finally projected upon the camera tube. Where there is a 1:1 relationship in the size of the actual filter and the image of it on the photo-sensitive area of the camera tube, of course the actual filter is formed in the same size. Where there is a reduction in size due to the optical system of the image of the filter as it is produced upon the photosensitive element of the camera tube, of course the filter strips in the actual filter may be larger in proportion to the size reduction in the image. It is completely dependent upon the optical system. The significant features are, however, that the light of the imaged filter area when reaching the camera tube preferably is projected to widths of those mentioned, and of lengths corresponding essentially to at least the height of the picture area scanned.

To achieve these results, the image of a scene represented conventionally at 19 is projected by a main objective lens 31 through a suitable field lens 33, which serves to bring the rays essentially into parallelism so as to focus upon the color filter 11. The image of the scene as viewed through the color filter 11 is then focused by means of an objective 35 upon the light-sensitive end 37 of the camera tube 17. It has already been explained in Letters Patent of the United States of the present applicants, No. 2,630,485, that the field lens 33 is positioned immediately adjacent the multiple-strip color filter element, herein 11. The field lens is preferably a Fresnel type, and directs the light from the main objective lens 31 into the second objective lens 35. The Fresnel type field lens 33 need not be of an especially high quality, since it actually does not contribute to the image formation, but the type chosen should preferably be selected as against a standardized converging lens in order to avoid the introduction of serious Petzval curvature effects. The steps in the Fresnel lens should be sufficiently shallow to provide negligible shadowing in the image.

Between the field lens 33 and color filter 11 and the second objective 35 there is a partially reflecting mirror 39. This mirror 39 is located in the optical path of the light from the main objective 31 through to the second objective 35 and the camera tube 17, and positioned therein, for example at an angle of 45° to the axis of the main objective 31 and the optical axis of the tracking filter 21. Other angles may be used where desired. This partial reflector 39 may have any transmission range between one-half and that maximum value at which it will reflect the minimum amount of light directed thereon from a path originating on the surface side toward the multiple-strip color filter 11. For simplicity of explanation, however, it will be assumed that the partially transparent reflector or mirror 39 is a half-silvered surface, although in some instances, as was pointed out in applicants' U. S. Patent No. 2,630,485, the reflection from a plain sheet of glass may be adequate.

The tracking filter 21 is arranged adjacent a lens element 41 which receives light of generally constant value from a source 43. The optical axis of the lens 41 which passes through the tracking filter perpendicularly to the plane of the tracking filter is so located in the illustrated example that it meets the plane of the partial reflector or mirror 39 in a direction 45° thereto, and in a direction normal to the optical axis of the main objective 31. The optical path length from the objective 35 to the plane of the tracking filter 21 is preferably the same as to the color filter 11.

Any light representing a scene or image 19 which is directed through the main objective 31 to the camera tube to focus upon the color filter 11 and thence into the second objective 35 will be representative of the image broken into its separate colors insofar as the transmission characteristics of the filter 11 are concerned. Light losses depend, of course, upon the transparency of the partial reflector 39 arranged transverse to the optical axis of the main and second objectives 31 and 35, respectively. At the same time, because of the illumination of the tracking filter 21 by light from the source 43 passed thereto by the lens 41, the image of the tracking filter is concurrently projected upon the photo-sensitive area 37 of the camera tube 17 by reason of some of the light of the tracking filter image being reflected along the optical axis of the second objective from the partial reflector 39. The fact that some of the light of the image 19 and the color filter 11 is lost, due to reflectance from the partial reflector, and the fact that some of the light of the tracking filter image is lost due to transmission through the partial reflector 39 is in no way critical except as it reduces the amount of light reaching the tube 17. However, such light of the image 19 and the color filter 11 as is transmitted through the partial reflector 39 and that light of the tracking filter 21 which reflected from the partial reflector 39 combine along the optical axis of the objective 35 and are focused upon the photo-sensitive end of the camera tube 17 by this second objective. The color filter 11 and the tracking filter 21 and the optical components associated therewith, such as the field lens 33, the lens 41 and the second objective 35, are all fixed in position one with respect to the other. They form a supplementary optical component which is interposed between the main objective and the camera tube 17. The main objective is indicated as being movable in two directions along its optical axis for the purpose of focusing the image 19 first upon the filter 11 and thence upon the camera tube by way of the second objective 35. The arrangement of the other components is stationary one with respect to the other, so that there are, essentially, no moving parts in the assembly. The operation of the optical system is such that precise and accurate functioning is obtained with this arrangement of components located in stationary relationship one to the other. However, for reason of camera tube characteristics and the fact that electrostatic effects manifested on the scanned tube target area cause damage to the tube if the same target area is subjected to the same charge effects continually, it is desirable to maintain color fidelity on account of the tendency of some tubes to "burn-in" to provide an extremely slow relative movement of approximately 0.004" to 0.006" between the tube and the optical system or the filter. The movement occurs at a rate of about five (5) cycles per minute. This movement is of the order of magnitude of about one picture point and may be that of the width of any cycle of three color strips on the color filter as it is imaged upon the camera tube. This feature of the operation is explained more particularly in a concurrently-filed application of the same applicants entitled "Image Displacement Device for Television Camera," Serial No. 259,194 and now abandoned and reference is made thereto for further description. It, however, must be emphasized that the subject matter of the last-mentioned concurrently-filed application is a refinement of the system herein proposed, and is not, principle-wise, a necessary element to the broad combination. To the contrary, it is an addition brought about by undesirable camera tube characteristics which, at some day, may be eliminated. Generally speaking, movement of this nature is unnecessary in black-and-white operations, for such continuous patterns are not usually encountered, but where the camera tubes are used to provide a test pattern from direct pick-up it is customary to move the test pattern itself at a relatively low rate such as that herein proposed with respect to the camera tube. Consequently, motion of the tube relative to the filters and lens elements or movement of one of the lens elements relative to the filters and tube, or a movement of the filters relative to the lens system and tube provides essentially the same characteristics.

Under the foregoing proposals, the images of the tracking and color filters, when superimposed upon the light-sensitive end wall 37 of the camera tubes 17 may have a general appearance such as that conventionally illustrated by Fig. 5. In Fig. 5, the color filter and tracking filter are shown as having strips which are just slightly displaced one from the other. This provides a clearly workable operation, but any fixed displacement can be used. The showing in Fig. 5, therefore, has been made solely to make for clarity in indicating the fact that the two filter images are superimposed. As the strip widths of the color and tracking filters are such that in projection upon the camera tube light-sensitive area they are focused to like widths, it can be appreciated that the repetition frequency bears a relation of 2 for the color filter to 3 of the tracking filter with respect to the total number of strips required to make up each repeating cycle.

In the illustration of Fig. 5, there has been an attempt made to show the relationship between the superimposed tracking filter exemplified in Fig. 3 and the color filter of Fig. 1. To make clear the separation between the tracking filter 11' and the color filter 11, the tracking filter has been slightly displaced laterally with respect to the color filter, and the color components of the color filter have been omitted. Where it is desired to provide the tracking frequency at some other relationship than precisely the 3:2 herein suggested, it, of course, is possible to have the edges of the filters substantially parallel, although the filter sections will not precisely overlap one another. Further than this, where circuit additions can be tolerated whereby a shift from precise parallelism of the edges of the filters with respect to each other, these filters may be slightly transverse with respect to each other. However, under such circumstances, it is necessary, to insure accurate tracking and precise accuracy of color representation, to control not only the lateral motion of the scanning beam in its line deflection path, but also to interlock with this a control in the direction it moves from the top to the bottom, for instance, of the scanned image area. This correction then is provided in the field scanning direction, and introduces additional complexities in the operation. It is for these reasons that the invention, insofar as its circuitry or control is concerned is explained particularly in connection with its simplest form.

It has been indicated in one embodiment of the invention as hereinbefore outlined that the tracking and color filters are separate one from the other. It is, however, possible to arrange them in such fashion that they are substantially adjacent one another, and in the same plane, for instance. For such circumstances it is possible to arrange certain of the strips in such a way that they become fluorescent and effectively operate to add light upon the photosensitive element of the camera tube so that the tracking frequency may be established.

Further than this, while it has been inferred for simplicity of reference that the color filter strips are all of the same width, it is believed to be evident that, if conditions so require, the strips may be of slightly different widths. For instance, by providing the filters with strips of slightly different width compensation for changes in color balance of the camera tube may be taken care of optically rather than to require electrical balance, according to well known principles. Under these circumstances, the relative widths of the red, blue and green filters may be slightly different, with the combined width such that they repeat as a group at the color cycle frequency selected. It nonetheless should be emphasized that since the camera should resolve the individual color strip, width variations thereof, as a general proposition, are not required. Furthermore, it will be appreciated from the showing hereof that color balance can be achieved optically to a reasonable approximation by proper selection of the filter characteristics themselves. In addition, with apparatus of the type herein disclosed it also will be apparent that color balance in its broadest sense is readily realizable according to electrical control principles in about as easy a manner as anything to be expected. This is because the three separate component signals which are simultaneously present and available at the output terminals as explained in detail in applicants' copending application, Serial No. 259,193 can be controlled with respect to each other through adjustment of the connecting point on the well known output resistors across which the load is derived. Full understanding of the operation of the circuitry by which the signal output of the camera tube herein described is utilized may be had from the last named copending application and reference to such application is herein specifically made for a further understanding thereof.

The tracking filter strips also are preferably of like width, but it should be borne in mind that the operation may be carried on with these strips also of somewhat different widths. The significant feature is that the strip widths are such that, in projection, the strips are imaged on the camera tube to provide the desired tracking repetition frequency.

Further than this, within the meaning of what has herein been stated it should be understood, of course, that where reference is made to the parallelly positioned strips of the filters as they are imaged on the camera tube, the broad interpretation to be given is that the reference means essentially parallel. Likewise, where reference is made herein to the hues of the multicolor filter, this reference provides for filter strips of less than full saturation, and in such sense the term "hue" carries reference to the dominant wavelength of light transmitted. The term thus is essentially the equivalent, from the standpoint of interpretation, to the reference to the unsaturated filter herein described.

Further than this, while reference has been made in these specifications to the arrangement of the field lens intermediate the main objective and the color filter 11, for instance, it will be appreciated that in actual practice the field lens may be arranged intermediate the filter 11 and the second objective 35, it being positioned, however, in proximity to the filter component.

Further than this, while reference has herein been made for simplicity of understanding to the fact that a 3:2 relationship has been selected for the relative tracking filter frequency and the color repetition cycle frequency, it is, of course, equally apparent that other relationships may be established. Where the relationship is other than a 3:2 relationship, for instance, the relative widths of the tracking filter strips as compared to any one of the color filter strips will not be the same. Also, where it is desired to have the color filter strips of different relative widths within each color cycle, it is equally apparent that even where the 3:2 relationship is maintained between the tracking filter frequency and the color repetition cycle frequency, the strip widths may not always correspond. Accordingly, within the meaning of the herein-claimed subject matter it will be understood that reference to the strip widths is to be interpreted in a manner sufficiently broadly to permit variances of such character in the arrangement.

As explained hereinabove, the color phasing filter is assumed to be located in such position relative to the tracking filter that the image of the phasing filter occupies the overscan area. From this statement and consideration of the invention as hereinbefore set forth in order to simplify the disclosure, it should not be inferred that there is an absence of tracking information indicative of the rate of scan in this overscan area. Were the phasing information of the color cycle repetition frequency only to be included, the desired precision of operation would not readily be attainable with the desirable degree of assurance. The invention therefore contemplates imaging filter strips on the photo-sensitive area of the camera tube in such a way that the effect manifested in the overscan area produces, with scanning, signals from which both the phase of the color repetition cycle and the tracking are simultaneously developed. This is similar to the case with the simultaneously present information relative to the color cycle repetition frequency and the rate of scan (the tracking) during the period of scansion of the effects manifested in the camera tube by the thereon-projected image of the scene.

The important and significant feature which characterizes the herein-proposed apparatus is that the frequency of repetition of the color cycle selected at the camera tube may be chosen completely independently of any color cycle repetition rate chosen for the final transmission. Thus, the camera color cycle repetition is merely illustrative, and not limiting. This is because of the fact that the herein-proposed apparatus makes possible the obtainment at its output for delivery to the load circuit of signals which are indicative of the mixed-highs, or picture detail, which is independent of the color cycle repetition frequency. In addition, the signals which are indicative of the color values only are all concurrently present and simultaneously available. The result is that color information in all colors is continuously available, so that the rate at which the individual controlling signals from which the color information is derived is insignificant and of no moment.

What is claimed is:

1. Apparatus for directing optical images upon the imaging plane of a camera tube to cause, with scansion within the tube, the production of signals from which color television images are re-creatable comprising, in combination, a color filter having a plurality of cyclically repeating substantially uniform width color filter strips each individually transparent to one of the primary hues of a tricolor additive system, a tracking filter having a plurality of strips of different light transmitting characteristics alternately repeating, said color and tracking filters each being fixedly supported relative to each other and to the camera tube, means for projecting the images of each of the said filters in superposition within substantially like areas upon the imaging plane of the camera tube, means for projecting upon the same imaging plane through at least the color filter an image also of substantially like size of a scene so that the projected image of the scene, as modified by the color filter, is also superimposed on the tracking filter image, the filter strips of the color and tracking filters being in such relationship one with respect to the other in projection that when signals are developed as a result of scansion within the tube the frequency *a* is developed due to the color cycle of the projected color filter image and frequency *b* is developed due to the tracking filter image and the developed frequency *b* is adaptable for synthesizing the rate of scansion.

2. Apparatus for directing optical images upon an imaging plane of a camera tube to control the production of signals with scansion so that television images are re-creatable therefrom comprising, in combination, a fixedly supported color filter having a plurality of cyclically repeating color filter strips each individually transmissive of light of one unsaturated component color of a tricolor additive system, a fixedly supported tracking filter having a plurality of alternately arranged uniform width strips of different light transmission characteristics, means for supporting the color and tracking filters in fixed location relative to each other, means for projecting the images of each of the said filters in superposition and within substantially like areas upon the imaging plane with the strip edges of each of the color and tracking filters parallel and the respective filter strips of the color and tracking filters imaged in selected widths, and means for projecting an image of a scene through at least the color filter upon the same plane with the projected image of the scene, as modified by the color filter, also superimposed on the tracking filter image within a substantially like area, the widths of the filter strips of the imaged color and tracking filter strips being such that the signals resulting from scansion include the frequency *a* developed due to the color cycle of the projected image of the color filter and a non-harmonically related frequency *b* developed due to the projected image of the tracking filter with each developed frequency being a harmonic of a third frequency *c*.

3. Apparatus for directing optical images upon an imaging plane of a camera tube over which scansion is adapted to occur to produce signals from which television images are re-creatable comprising, in combination, a color filter having a plurality of cyclically repeating color filter strips each individually transmissive of light of one unsaturated component color of a tricolor additive system with the saturation of the individual strips in each component color being substantially uniform, a tracking filter having a plurality of alternately arranged uniform width strips of different light transmission characteristics, means for fixedly supporting the color and tracking filters relative to each other and in different planes, means for projecting the images of each of the said filters in superposition and within substantially like areas upon the imaging plane of the camera tube with the strip edges of each of the color and tracking filters extending parallel to each other and the respective filter strips of the color and tracking filters imaged in selected widths, and means for projecting an image of a scene through at least the color filter upon the same imaging plane with the projected image of the scene, as modified by the color filter, also superimposed on the tracking filter image within a substantially like area, the widths of the filter strips of the imaged color and tracking filter strips being such that when signals are developed with scansion in the tube the images cast upon the said plane produce the frequency *a* due to the color cycle of the projected color filter and a non-harmonically related frequency *b* due to the tracking filter with each developed frequency being a harmonic of a third frequency *c*.

4. Apparatus for directing optical images upon the light sensitive element of a television camera tube wherein scansion occurs to produce signals from which television images are re-creatable comprising, in combination, a fixedly supported color filter having a plurality of cyclically repeating color filter strips extending parallel to each other and individually transparent to light of the unsaturated component colors red, blue and green of a tricolor additive system, a fixedly supported tracking filter having a plurality of strips also extending parallel to each other and alternately transmissive of light in different degrees, means for projecting the images of each of the said color and tracking filters in parallel relationship and in like strip widths relative to each other in superposition within substantially like areas of the tube light sensitive element and means for also projecting an image of a scene through the color filter upon the same light sensitive element with the projected image of the scene, as modified by the color filter, also superimposed on the tracking filter image within a substantially like area, the relative widths of the filter strips of the color and tracking filters as imaged upon the light sensitive target being such that when signals are developed as a result of the cast images the frequency *a* is developed due to the color cycle of the projected color filter and a non-harmonically related frequency *b* is developed due to the tracking filter and each developed frequency is a harmonic of a third frequency *c*.

5. Apparatus for directing optical images upon an imaging plane to control the production of signals with tube scansion so that television images may be re-creatable therefrom comprising, in combination, a planar color filter having a plurality of cyclically repeating color filter strips individually transparent to light of the unsaturated component colors red, blue and green of a tricolor additive system, a planar tracking filter having a plurality of strips alternately transmissive of light in different degrees, means for fixedly supporting the said color and tracking filters individually and relative to each other, a partial reflector positioned to receive the image of each filter and to transmit one and reflect the other to combine the images in coincident paths, an objective for projecting the combined images of each of the said color and tracking filters in superposition within substantially like areas of an imaging plane with the strip edges of each of the color and tracking filters parallel and with the image of each filter strip being projected to substantially like individual strip widths on the imaging plane, and a main objective for projecting and focusing an image of a scene upon the color filter so that the scene as modified by the color filter, may be imaged upon the same plane with the projected image of the color filter and the therewith superimposed tracking filter image and within a substantially like area, the widths of the filter strips of the color and tracking filters as imaged upon the plane being such that when signals are generated as a result of scansion of the effects manifested by the cast images the frequency *a* is developed due to the color cycle of the projected color filter and a non-harmonically related frequency *b* is developed due to the tracking filter with each developed frequency being a harmonic of a third frequency *c*.

6. The apparatus claimed in claim 5 wherein the projected widths of the color filter strips upon the camera tube are such that with scanning the frequency *b* is higher than frequency *a*.

7. The apparatus claimed in claim 5 wherein the partial reflector is positioned transverse to the optical axis of the main objective and at substantially 45° to the plane of each of the tracking and color filters.

8. The apparatus claimed in claim 7 wherein the tracking filter image is projected upon the partial reflector along such path that the usable light image therefrom is reflected into the objective for focusing upon the imaging plane.

9. The apparatus claimed in claim 8 wherein the color filter image is supported transversely of the optical axis along which light of a scene is revealed upon the imaging plane.

10. An optical system for color television tubes comprising a first objective and a second objective each having a common optical axis, a fixedly supported color filter having a plurality of adjacent cyclically repeating uniform width color filter strips each individually transparent to light of one of the primary hues of a tricolor additive system, a fixedly supported tracking filter also having a plurality of parallel strips of two different alternating light transmitting characteristics, means for projecting an image of the strips of each of the color filter and the tracking filter through the second objective upon an imaging plane in such manner that the respective strips are parallelly arranged and the projected width of each color filter strip is of the general order of one dimension of a point of a television image to be scanned and the projected length of the strips is at least the height of the image to be scanned and the projected width of the tracking filter strips is of the same order of magnitude as the color filter strips and approximately like length one of the lenses being axially movable to focus an image of a scene upon the imaging plane with image to be focused passing through at least one of the color and tracking filters.

11. An optical system for color television tubes comprising first objective lens and a second objective lens each having a common optical axis, a fixedly supported color filter having a plurality of adjacent uniform width color filter strips each individually transparent to light of one of the primary hues of a tricolor additive system and arranged as cyclically repeating color triplets, a fixedly positioned tracking filter having a plurality of parallel strips of two different characteristics with respect to light transmission arranged alternately one with respect to the other, means for projecting an image of the strips of each of the color filter and the tracking filter through the second objective lens upon an imaging plane in such manner that the respective strips are parallelly arranged, the projected width of each color filter strip being of general order of one dimension of a point of a television image to be scanned and the length of the strips being substantially the height of the television image to be scanned, and the projected width of the tracking filter strips being of the same general order of magnitude as each color filter strip and of substantially like height, and means for adjusting the axial position of the first objective lenses axially to focus an image of a scene upon the imaging plane of the second objective lens with the so-focused image first directed through the color filter.

12. An optical system for color television apparatus comprising a first objective lens and a second objective lens each having a common optical axis and arranged to project an image directed into the first objective lens upon the imaging plane of the second objective lens, a color filter comprising a plurality of cyclically repeating uniform width color filter strips each individually transparent to light of one of the primary hues of a tricolor additive system and arranged to repeat in cyclic order as color triplets, means for fixedly positioning the said color filter in a plane transverse to the optical axis of the lenses so that the color filter image is focused by the second objective lens upon the same imaging plane as images directed into the first objective lenses, the width of the color filter strips being such that when projected upon the imaging plane of the second objective they are of the order of an elemental dimension into which an image is resolved for scansion in a television camera tube and of a length of the order of the height of the so-scanned image, a fixedly supported tracking filter having a plurality of strips of different light-transmitting characteristic alternating one with respect to the other, means for introducing an image of the tracking filter into the optical path at a point between the first and second objectives so that the second objective focuses the image of the tracking filter in superposition to the image directed into the first objective and the image of the color filter upon the imaging plane of the second objective, the width of the tracking filter strips being such that in projection upon the imaging plane of the second objective they are of the same general order of magnitude as width of the color filter strips and of substantially like length.

13. The optical system claimed in claim 12 comprising, in addition, a field lens supported in axial alignment with the first objective lens and intermediate said lens and the color filter.

14. The optical system claimed in claim 13 comprising, in addition, a partially transparent mirror positoned in a plane substantially 45° to the optical axis of the first and second objectives and in a location to reflect the image of the tracking filter into the second objective and to transmit the image of any scene within the field of view of the first objective and an image of the color filter into the second objective.

15. Apparatus for directing optical images upon the photo-electric area of a camera tube within which scansion is adapted to occur to produce television image signals comprising the combination of a first objective arranged to image a scene upon a plane between the objective and the camera tube photoelectric area, a second objective between the imaging plane of the first objective and the camera tube photoelectric area for imaging the said plane upon the said camera tube area, and fixedly supported color filter means having a plurality of strips each of unsaturated colors individually transparent to light of the component colors of a tricolor additive system arranged in cyclically repeating color triplets located substantially at the plane of focusing of the first objective, so that any scene imaged upon the camera tube is directed through the said color filter to be broken into its selected component colors as so imaged.

16. The apparatus claimed in claim 15 comprising, in addition, a fixedly positioned tracking filter comprising a plurality of strips of different light transparency arranged in alternately repeating at sequence, said tracking filter being spaced from the second objective by an optical distance substantially equal to the distance of the color filter therefrom so that the second objective images the color and tracking filters superimposed upon the camera tube with the strips of each parallelly arranged and imaged in substantially equal widths.

17. The apparatus claimed in claim 16 comprising, in addition, a field lens included in the optical path of the first and second objectives and substantially adjacent to the color filter.

18. Apparatus for directing optical images upon the photoelectric area of a camera tube within which scansion is adapted to occur to produce signals comprising the combination of a first objective arranged to image a scene upon a plane between the objective and the camera tube photoelectric area, a second objective having an optical path common to the first objective and located between the imaging plane of the first objective and the camera tube photoelectric era for imaging the said plane upon the said camera tube, a field lens included in the common optical path and substantially adjacent to the imaging plane of the first objective and a fixedly supported color filter having a plurality of strips each .of unsaturated colors individually transparent to light of the component colors of a tricolor additive system arranged in a cyclically repeating order of color triplets located substantially at the plane of focusing of the first objective so that any scene imaged upon the camera tube is directed through the field lens and the said color filter to be broken into its selected component colors as so imaged.

19. An optical system for color television apparatus comprising a first objective lens and a second objective lens each having a common optical axis and arranged to project an image directed into the first objective lens upon the imaging plane of the second objective lens, a color filter comprising a plurality of parallelly arranged color filter strips of generally uniform width each individually transparent to light of one of the unsaturated component colors of a tricolor additive system and arranged as cyclically repeating color triplets, means for fixedly supporting said color filter in a plane transverse to the optical axis of the first objective lens at substantially the focal plane of said lens, a fixedly supported tracking filter having parallelly arranged strips of different light transparency arranged in a cyclically repeating order, means for locating the tracking filter from the second objective at a distance substantially equal to that of the color filter from said second objective, so that the second objective focuses the images of both the color and tracking filters in superposition and parallel to each other upon the imaging plane of the second objective, the widths of the individual color and tracking filter strips being such that in projection upon the imaging plane of the second objective they are of the same general order of magnitude and of substantially like lengths.

20. The optical system claimed in claim 19 comprising, in addition, a field lens supported in substantial axial alinement with the common optical axis of the first and second objectives and located substantially adjacent to the plane of the color filter.

References Cited in the file of this patent

UNITED STATES PATENTS

| | | |
|---|---|---|
| 2,479,820 | De Vore | Aug. 23, 1949 |
| 2,530,431 | Huffman | Nov. 21, 1950 |
| 2,545,325 | Weimer | Mar. 13, 1951 |
| 2,552,070 | Sziklai | May 8, 1951 |
| 2,604,534 | Graham | July 22, 1952 |
| 2,630,485 | Heikes | Mar. 3, 1953 |